(12) United States Patent
Leue et al.

(10) Patent No.: US 10,528,651 B2
(45) Date of Patent: Jan. 7, 2020

(54) CLIENT-SIDE AGGREGATION OF WEB CONTENT

(71) Applicant: International Business Machines Corporation, Armonk, NY (US)

(72) Inventors: Carsten Leue, Sindelfingen (DE); David Winter, Berlin (DE)

(73) Assignee: International Business Machines Corporation, Armonk, NY (US)

( * ) Notice: Subject to any disclaimer, the term of this patent is extended or adjusted under 35 U.S.C. 154(b) by 80 days.

(21) Appl. No.: 15/949,153

(22) Filed: Apr. 10, 2018

(65) Prior Publication Data

US 2018/0225269 A1 Aug. 9, 2018

Related U.S. Application Data

(63) Continuation of application No. 14/059,858, filed on Oct. 22, 2013, now Pat. No. 10,013,401.

(30) Foreign Application Priority Data

Dec. 11, 2012 (GB) .................................. 1222213.9

(51) Int. Cl.
  *G06F 17/20* (2006.01)
  *G06F 17/22* (2006.01)
  *G06F 16/958* (2019.01)
(52) U.S. Cl.
  CPC ........ *G06F 17/2247* (2013.01); *G06F 16/958* (2019.01); *G06F 17/227* (2013.01)
(58) Field of Classification Search
  None
  See application file for complete search history.

(56) References Cited

U.S. PATENT DOCUMENTS

| 7,827,494 B1 | 11/2010 | Hedayatpour et al. |
| 2005/0010634 A1 | 1/2005 | Henderson et al. |
| 2005/0030939 A1 | 2/2005 | Roy et al. |
| 2006/0026510 A1 | 2/2006 | Boag et al. |
| 2006/0064422 A1 | 3/2006 | Arthurs et al. |

(Continued)

FOREIGN PATENT DOCUMENTS

WO 2010113043 A2 10/2010

OTHER PUBLICATIONS

GB Patent Application No. 1222213.9—UK IPO Search Report dated May 21, 2013.

(Continued)

*Primary Examiner* — Shahid K Khan
(74) *Attorney, Agent, or Firm* — Law Office of Jim Boice

(57) ABSTRACT

A method, system, and/or computer program product provides client-side aggregation of web content. A client system receives a first and second set of content to be displayed on a web page and an associated style sheet describing a visual layout to be used when displaying the web page. The first and second sets of content are aggregated to create a combined set of content. A fully aggregated web page is created by transforming the combined set of content into a hypertext markup language (HTML) document. A browser on the client system then renders and displays the fully aggregated web page. An activation of an element on the rendered fully aggregated web page is detected, causing a change to the combined set of content. In response to detecting the activation of the element, a full page refresh of the rendered fully aggregated web page is executed.

20 Claims, 9 Drawing Sheets

(56) References Cited

U.S. PATENT DOCUMENTS

2007/0136415 A1    6/2007  Behl et al.
2009/0106651 A1    4/2009  Gorog
2014/0325343 A1   10/2014  Rao

OTHER PUBLICATIONS

Wikipedia, "XSL" (Available at https://en.wikipedia.org/wiki/xsl) (Retrieved Sep. 30, 2016).
M. Gupta, "Client Side Aggregation vs Server Side Aggregation" (Jun. 3, 2009) [Online] [Available at https://www.techspot.com.in/2009/06/client-side-aggregation-vs-server-side.html] [Retrieved Jul. 17, 2014].
U.S. Appl. No. 14/059,858 Non-Final Office Action dated Jul. 31, 2015.
U.S. Appl. No. 14/059,858 Final Office Action dated Mar. 15, 2016.
U.S. Appl. No. 14/059,858 Non-Final Office Action dated Oct. 6, 2016.
U.S. Appl. No. 14/059,858 Final Office Action dated Jun. 13, 2017.

CLIENT-SIDE AGGREGATION OF WEB CONTENT

This application is based on and claims the benefit of priority from United Kingdom (GB) Patent Application 1222213.9, filed on Dec. 11, 2012, and herein incorporated by reference in its entirety.

BACKGROUND

The present invention relates generally to the field of navigating a portal site and providing web content, and in particular to a method for client-side aggregation of web content. The present invention relates further to an Extensible Stylesheet Language (XSL) transformer module for client-side aggregation of web content, a computing system, a data processing program, and/or a computer program product.

Today, information retrieval and access without Internet technologies are nearly impossible to imagine. With the beginning of the World Wide Web (WWW), a user requested a hypertext document from a server and the server returned the same static document for every same request. Every user received the same content for the same entered URL (universal resource locator).

With the emergence of dynamic client and server technologies, a server was able to generate dynamic content. Servers could provide complex and dynamic content for business applications and user interfaces, depending on a variety of factors, e.g., client request parameters, user preferences, or backend state. Now, portal server products use dynamic technologies and aggregate dynamic and static independent content from different sources or applications into an integrated content view. These content components are named portlets in a portal environment.

There are two types of content aggregation, server-side content aggregation and client-side content aggregation.

In general, referring to FIG. 2, a browser/client BC sends a request R to the server S and the server responses with the content of the web page's page content PC. The client loads linked resources like images, or style-sheet, or JavaScript files afterwards. Caches in-between, like browser cache C1 or network node cache C2, can save the response from the server and returns it as a response for next same requests depending on the response header information.

Referring to FIG. 3, in the server-side content aggregation case, the server S takes the request R from the client BC, processes it, aggregates the content in the server-side and of the different portlets together to the page content PC and responds with the logically complete content to the client. Every time, the full page content is returned from the server, the browser only renders it for the user. Search engines are easily able to search or index the page content. Every click on a new page content link triggers a full page change. The involved caches can only save and return the full content for an identically requested URL depending of the response header information. When the page content is aggregated on the server, the page's cache-ability is that of the least cacheable component, typically leading to a limited cache-ability.

In the client-side content aggregation case as opposed to the server-side aggregation, the server does not provide a logically complete content. It only sends the page content skeleton and bootstrap code to initialize the aggregation but does not immediately provide the content of portlets. The client renders the content skeleton and aggregates the content client-side in the view layer by loading and injecting the content of every required portlet with help of client side technologies prior art based on JavaScript (JS). A click to change the content of the current view is almost all done by manipulating the existing content with help of JS. JS also has to manage the client-side state of the current view. The involved caches can save and return the particular required content fragments individually.

An example of known client-side aggregation of web content uses information that is provided to a client application by aggregation on a client-side of a logically separated client-side/server-side computing environment. Information may be retained on the client-side that is displayed by a client application with required information provided by a portal application server on the server-side of the client-side/server-side computing environment.

Client-side-content aggregation has the following advantages over server-side content aggregation. It saves bandwidth on the server and network nodes due to individually content fragment caching. Server-side CPU cycles are offloaded to the client-side. It also may load the page content faster, improves user experience and reduces infrastructure cost.

But traditional client-side content aggregation has also some drawbacks. It often needs many complex JavaScripts to load and manipulate content, manage the client-side state and interpret common browser events, all of which results in error prone user interface code. There may also often be flickering or undesired motion in the page during the rendering because the portlet content is injected after the rendering process by the browser. This is an inevitable consequence of using JavaScript for the client-side approach. Additionally, due to browser incompatibility in usage of JavaScript, it is necessary to test the client-side code in every supported client platform. Moreover, there is only limited "crawlability" for search engines or browsers' content "bookmarkability" because the JavaScript code has to be executed before the content is completed. Today's web crawlers, however, do not execute JavaScript. Additional drawbacks include the following: Heavy usage of JavaScript and rare page switches are often the reason of client memory leaks in the browser. Since the step of aggregating the page out of a skeleton and portlet fragments is executed in the rendering step of the browser, the script used to aggregate the page can easily conflict with other scripts on the page. This kind of interoperability problems is hard or impossible to debug and resolve.

SUMMARY

A method, system, and/or computer program product provides client-side aggregation of web content. A client system receives a first set of content to be displayed on a web page and an associated style sheet that describes a visual layout to be used when displaying the web page. A second set of content to be displayed in the web page is retrieved. The first set of content is aggregated with the second set of content to create a combined set of content, where executing script from the associated style sheet is blocked until said combined set of content is created such that no interaction between said aggregating and said executing the script occurs. In response to the combined set of content being created, a fully aggregated web page is created by transforming the combined set of content into a hypertext markup language (HTML) document. A browser on the client system renders and displays the fully aggregated web page through use of the HTML document. An activation of an element on the rendered fully aggregated web page is detected, where the activation of the element causes a change to the combined set of content. In response to detecting the activation of the element on the rendered fully aggregated web page, a full page refresh of the rendered fully aggregated web page is executed, where the full page refresh of the rendered fully aggregated web page releases memory that contained the associated style sheet.

BRIEF DESCRIPTION OF THE DRAWINGS

Illustrative embodiments of the invention will now be described, by way of example only, and with reference to the following drawings.

DETAILED DESCRIPTION

Figure 1:
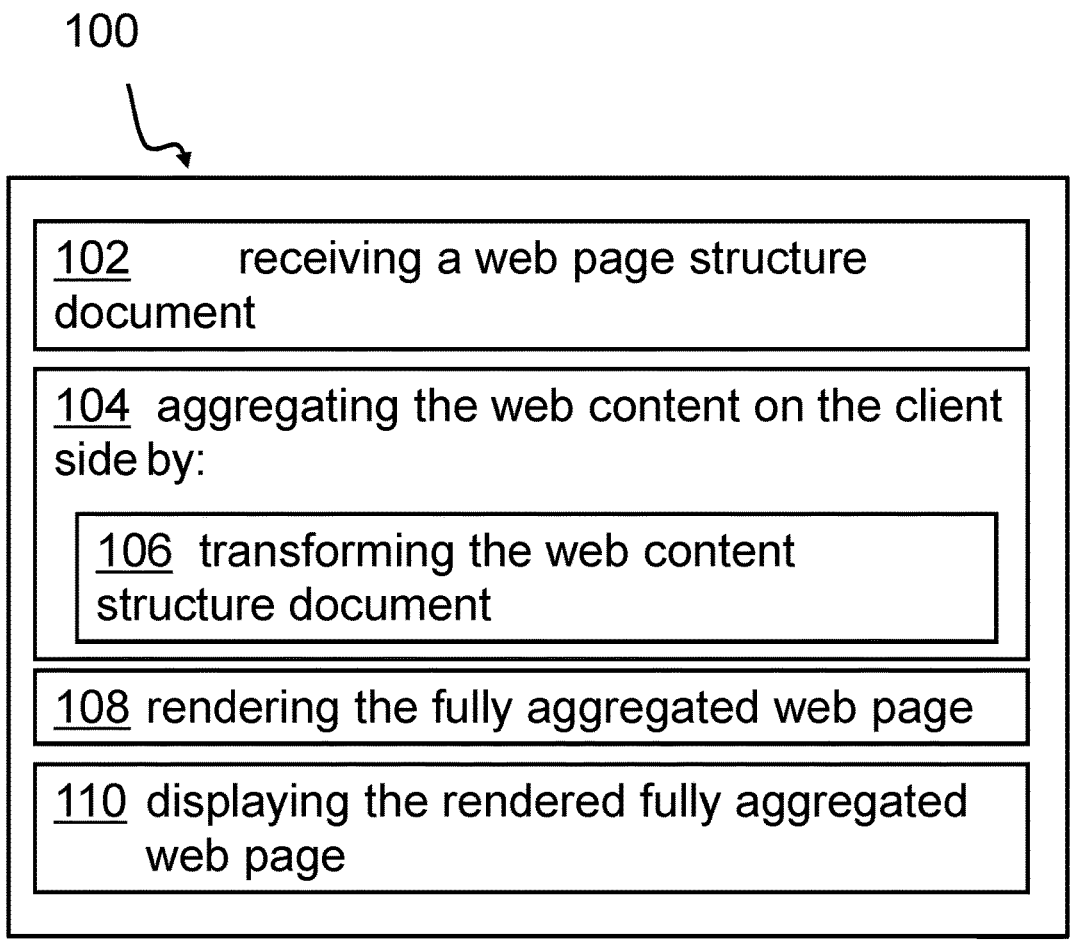
FIG. 1 shows a block diagram of an embodiment of the inventive method for client-side aggregation.

Server-side and client-side aggregation can be used independently of each other or in combination of both. As a result of their different natures, they cover a variety of operation scenarios. Nevertheless, there is room for improvement. Consequently, there may be a need for an improved client-side aggregation solving the above-mentioned drawbacks.

This need is addressed by the novel method, described herein, for client-side aggregation of web content, an XSL (eXtended Style-sheet Language) transformer module for client-side aggregation of web content, a computing system, a data processing program, and/or a computer program product according to the independent claims.

According to one embodiment of the present invention, a method for client-side aggregation of web content may be provided. The method may comprise receiving a web content structure document of a web page with an associated style-sheet by a client system, and aggregating the web content on the client-side by transforming the web content structure document into a target web page document by using the style-sheet, wherein during the aggregation further web content may be received based on information in the web content structure document using the style-sheet document resulting in a fully aggregated web page, and wherein the aggregation may not interfere with any other client-side transformation of the web content. The method may also comprise rendering the fully aggregated web page, and displaying the rendered fully aggregated web page.

According to another embodiment of the present invention, an XSL transformer module for client-side aggregation of web content may be provided. The XSL transformer module may comprise a receiving unit adapted for receiving a web content structure document of a web page with an associated style-sheet by a client system, and an aggregation unit adapted for aggregating the web content on the client-side by transforming the web content structure document into a target web page document by using the style-sheet, wherein during the aggregation further web content is received based on information in the web content structure document using the style-sheet document resulting in a fully aggregated web page, and wherein the aggregation does not interfere with any other client-side transformation of the web content. Furthermore, the XSL transformer module may comprise a rendering unit adapted for rendering the fully aggregated web page, and a displaying unit adapted for displaying the rendered fully aggregated web page.

It may be noted that the associated style-sheet may comprise web page design statements according to the extended style-sheet language belonging to the family of XML (eXtended Markup Language) code defined transformation languages. The underlying web content structure document may, e.g., be a document being defined using the XML language.

The target web page document may, e.g., be designed as an HTML document (hypertext markup language), and thus, may comprise HTML statements alongside with the pure content.

The web content that may further be received may be requested and/or fetched from the server and may, e.g., comprise images, portlet markups, fragments, and other information elements processable by a web browser like video and audio files.

In the context of this description, the following conventions, terms and/or expressions may be used:

The term "client-side aggregation" denotes that web content to be used or displayed on a client in a client/server computing environment may be aggregated on the client-side. In the context of this disclosure, aggregation of web content may not be intermixed with rendering of the web content to be displayed. Here, both activities (aggregation and rendering) may be logically separated.

The term "web content structure document" denotes content in a structured form of markup elements, such as portlet or theme markup fragments, etc., to be used on a computer system, e.g., a client system using a browser to display the content comprised in the web content structure document.

The term "web page" may be used in a skilled person's manner and may denote a document or information resource that is suitable for the World Wide Web and may be accessed through a web browser and displayed on a computer monitor or a screen of a mobile device or other end user facing devices. This information is usually in HTML or XHTML format (eXtended HTML), and may provide navigation to other web pages via hypertext links. Web pages frequently subsume other resources such as style-sheets, scripts and images into their final presentation.

The term "associated style-sheet" denotes a document using a style-sheet language, or style language, which may be a computer language that may express a presentation of structured documents. One attractive feature of structured documents is that the content may be re-used in many contexts and presented in various ways. Different style-sheets may be attached to the logical structure to produce different presentations. Modern style-sheet language make a widespread use of Cascading Style-sheets (CSS), which may be used to style documents written in HTML, XHTML, SVG, XUL, and other markup languages. For content in structured documents to be presented, a set of stylistic rules—describing, e.g., colors, fonts and layout—must be applied. A collection of stylistic rules is called a style-sheet.

For the current invention the style-sheet may refer to a set of rules that transforms the XML based web structure document into the final markup.

The term client system may denote a computing system being dependent in its full functionality from a server in a client/server computing environment.

The term "aggregating" denotes—in the context of web content—gathering information and style elements for a web page without executing scripts and/or Java code as part of the information element. An execution of scripts and/or Java code or other executable code elements as part of the information element may be performed after the aggregation, namely in a rendering step before displaying the web page.

The term "target web page document" denotes a web page document after an aggregation of web page content, wherein the instructions of the style-sheet document are instrumental. A source for the target web page document may be the web content structure document as well as the associated style-sheet. The target web page document may comprise a fully aggregated web page, but without any results from scripts or JavaCode.

The term "further web content" denotes content documents to be included into the final displayed web page, e.g., images, portlet markups, portlet fragments, etc.

The term "fully aggregated web page" denotes a web page document after the aggregation and before the rendering.

The term "XSL transformer module" denotes a device comprising elements as outlined in claim(s) and/or description provided herein. It may be implemented in hardware, in software or, in combination of hardware and software.

In the following, a detailed description of the figures will be given. All instructions in the figures are schematic. First, a block diagram of an embodiment of the inventive method for client-side aggregation of web content is given. Afterwards, further embodiments of the XSL transformer module for client-side aggregation of web content will be described.

FIG. 1 shows a block diagram of an embodiment of the method 100 for client-side aggregation of web content. The method may comprise receiving, 102, a web content structure document, e.g., an XML document, of a web page with an associated style-sheet, e.g., in XSL, by a client system, aggregating, 104, the web content on the client-side by transforming, 106, the web content structure document into a target web page document, in particular, in HTML format, by using the style-sheet. During the aggregation further web content may be received. In particular, it may be requested and fetched and/or received from the server. Such content may comprise images, portlet markups, information fragments, etc. This additional content may be based on information in the web content structure document and using the style-sheet document and it may result in a fully aggregated web page. However, the aggregation may not interfere, or be in conflict, or interact with any other client-side transformations of the web content, which may include, e.g., an execution of Java-Script or other scripts. Executing such scripts may be performed during rendering, 108, the fully aggregated web page. This fully aggregated web page may then be displayed, 110.

The presented method for client-side aggregation of web content offers several advantages:

In general, the present invention is an advancement over the traditional client-side content aggregation. But, it may not follow the existing client-side approach of aggregating the content during the rendering process. In contrast to this, the inventive approach may aggregate the content before the rendering process, however, still on the client-side. So, the browser will always receive a logically complete page before scripts and styles may be evaluated. Consequently, compared to prior art of client-side aggregation, any script execution may not be influenced by the aggregation process, since this process may occur before the script execution and may not be interwoven. Thus, at first, the page mark-up may be completely aggregated without any script execution. Then, in a following step, scripts of the web page may be executed independently from the aggregation process. So, in contrast to prior art, aggregation and script execution may be separated. Additionally, it adapts the full page refresh on every click from the server-side aggregation to the client-side aggregation. This will be outlined later using FIG. 4.

The inventive approach may not imply a particular implementation technology. The aggregation may be done with any technology that may be supported by browsers in that phase of the browser that may be located before the rendering process. One example of such a technology may be XSL transformation (XSLT), since the design concept of XSLT is to produce user facing mark-up, e.g., HTML, in contrast to technologies such as JavaScript that operate on top of already generated mark-up. The XSLT mark-up generation process may be able to combine multiple XML based mark-up sources. These different sources may represent components of the web page, e.g., portlets that get aggregated by the XSLT transformation.

The approach may also share advantages with existing client-side advantages like high performance and bandwidth saving because most of the page components may be cached in network nodes or a browser's cache.

Additionally, it may have the following advantages over existing client-side aggregation approaches: There may be no flickering of a user's view because the information fragments may be aggregated before the page may be rendered. There may be a clean full page refresh on every click which may prevent leaking of JavaScript memory. There may be full support for back buttons, bookmarks, and crawlers. Complex link rewriting may not be required because every click may result in a full page refresh. Complex script execution logic may not be required, since the web page may appear as a full web page to the browser and script may just be executed. It may also be ideal for mobile devices accessing the Internet, since the mark-up of the individual components may be smaller than the caching limit on, e.g., some mobile phones, in contrast to a serving of a full page.

An implementation of the current invention may be based on XSLT because this may have the following advantages: It is based on well-known standards and may be supported by all browsers, also on mobile devices. XML is smaller than HTML. This may reduce response element sizes. And, if portlets may generate XML instead of HTML fragments for the web page, an XSLT based implementation may also offload the rendering of the portlet's content to the client and reduce the bandwidth even more.

In the following, further advantageous embodiments will be described:

According to one embodiment of the method presented by the present invention, the step of aggregating may be completed before the step of rendering may be started. Using this separation, the step of aggregation and rendering may be logically separated completely. The aggregation may not be disturbed by any rendering activities like execution of scripts and styles.

According to a further embodiment of the method, the step of aggregating may be performed excluding any script execution. Script execution or an execution of Java-Code may be performed during the rendering step of the method. Again, it logically and time-wise decouples the two phases—aggregation and rendering—of the web page to be displayed. Thus, according to one embodiment of the method, scripts and styles of the web page may be evaluated and executed during the step of rendering.

According to an advantageous embodiment of the method, the aggregation may be implemented as a single extended style-sheet language transformation resulting in an HTML document. Thus, when a server may respond with an XML document with an associated style-sheet document on a client request, the extended style-sheet language transformation may be performed. The resulting HTML document may then represent the input for the step of rendering.

According to a further embodiment of the method, the aggregation may use a style-sheet document comprising theme components. This may enhance the applicability of the proposed method to a more or less complete range of applications.

According to one embodiment of the method, the style-sheet document may also comprise portlet related fragments. These may be present in the form of XML or HTML based documents. Thus, the normal mode of operation of web and/or portal pages may be handled by the inventive method.

According to just a further embodiment of the method, individually received elements of the web page by the client may be independently cacheable on the client-side. This may have the advantage that no transmission of the complete web page content may be required. Only small elements, e.g., an individual portlet content that may be handled individually may be required for re-transmission after small changes to the content of the web page displayed by the client.

According to one embodiment of the method, relative universal resource locators (URLs) are used in the portlet fragments for navigation. This may represent another enhancement due to the following: An XSLT theme may request portlet fragments, so each fragment may be cached individually. However these portlet fragments may contain themselves URLs that may need to contain the full navigational state of all components, so, the fragments would face the same cache-ability issue as a full page. The XSLT approach used here may solve this problem by using relative URLs in the portlet fragments. Each relative URL may only contain that portion of the navigational state that may be relevant to the fragment. The theme may establish a base URL such that these relative URLs may be appended to the base to form the full state. As a consequence, the cache characteristics of a portlet fragment may be decoupled from those of the full page.

Furthermore, embodiments may take the form of a computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

It should also be noted that embodiments of the invention have been described with reference to different subject-matters. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

Figure 2:
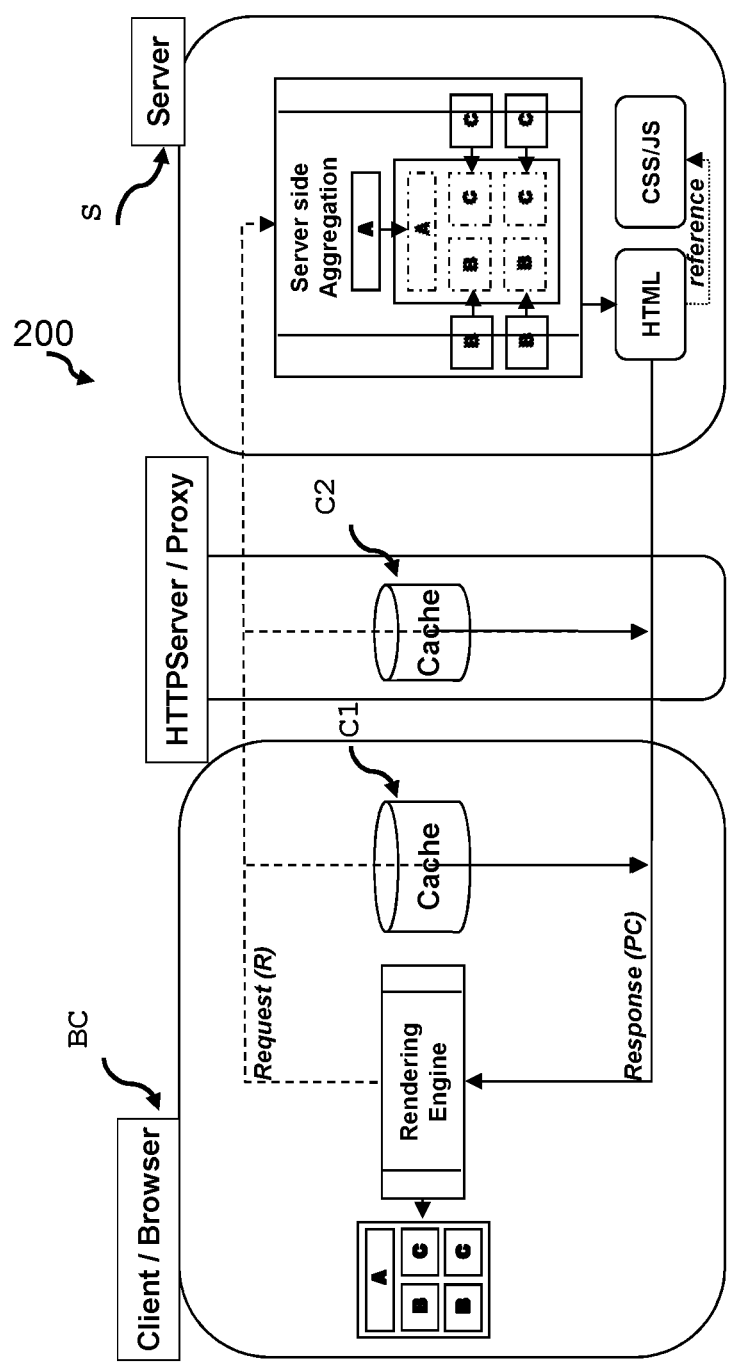
FIG. 2 shows a block diagram of a server-side content aggregation according to the state-of-the-art.

FIG. 2 shows a block diagram 200 of a server-side content aggregation according to the state-of-the-art. A server S may aggregate content "A", "B" and "C" in related portlets and send it—in response to a request R from a client/browser system BC—in HTML format which may have made references to cascading style-sheets (CSS) or Java-Script (JS) before sending it, potentially via an HTTPServer/proxy having a cache C2 to a rendering engine for display. The client/browser system BC may also have a cache C1.

Figure 3:
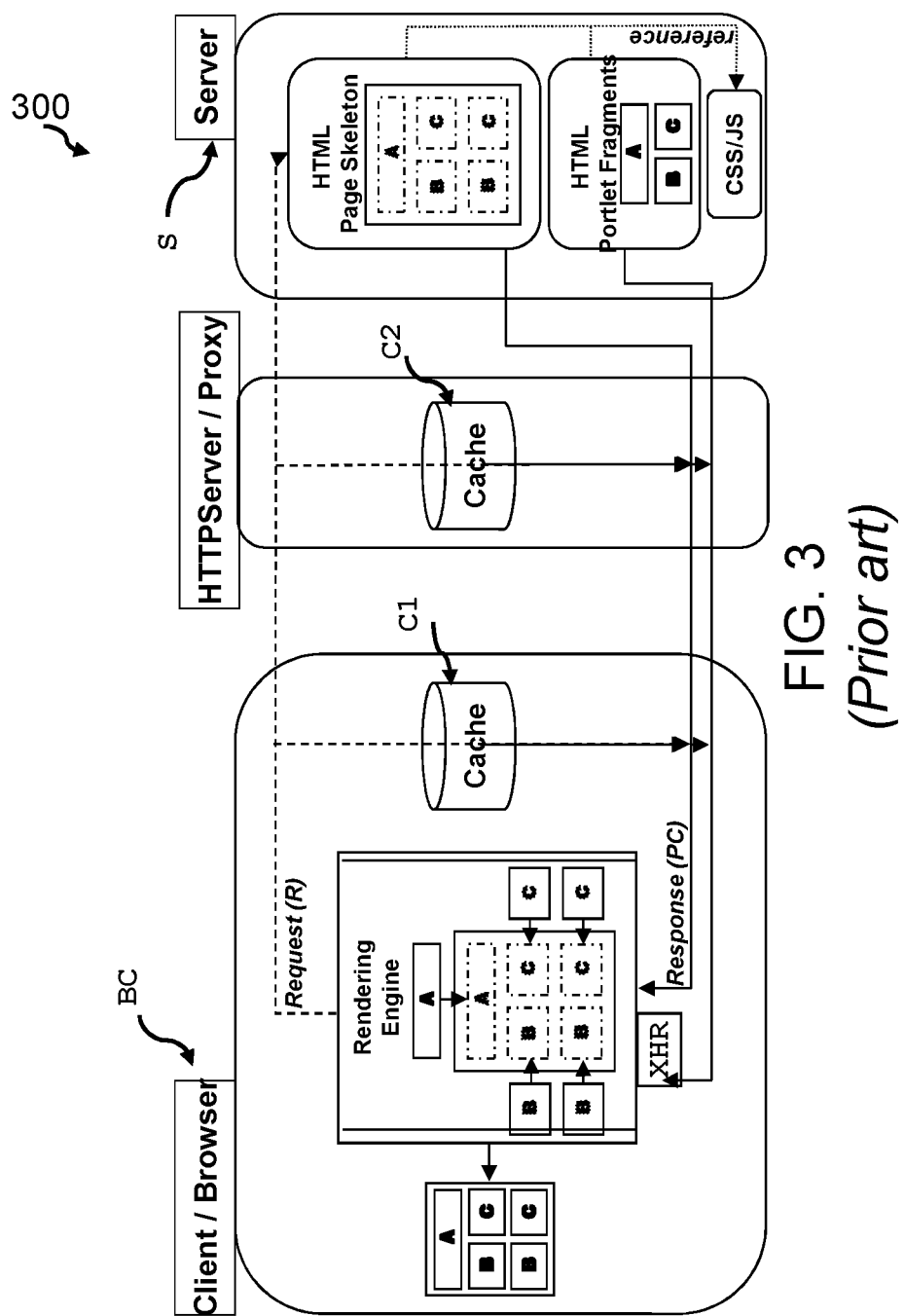
FIG. 3 shows a block diagram of a client-side aggregation according to the state-of-the-art.

In contrast to this, FIG. 3 shows a block diagram 300 of a client-side aggregation according to the state-of-the-art. In this case, the server S would provide an HTML skeleton with portlet frames to the rendering engine on the BC side. The function of the caches C1 and C2 may be unchanged. A request R from the client/browser may result in HTML portlet fragments A, B, C with potential references to CSS/JS. These portlet fragments may then be integrated into the earlier received HTML page skeleton by the rendering engine and may be displayed.

Figure 4:
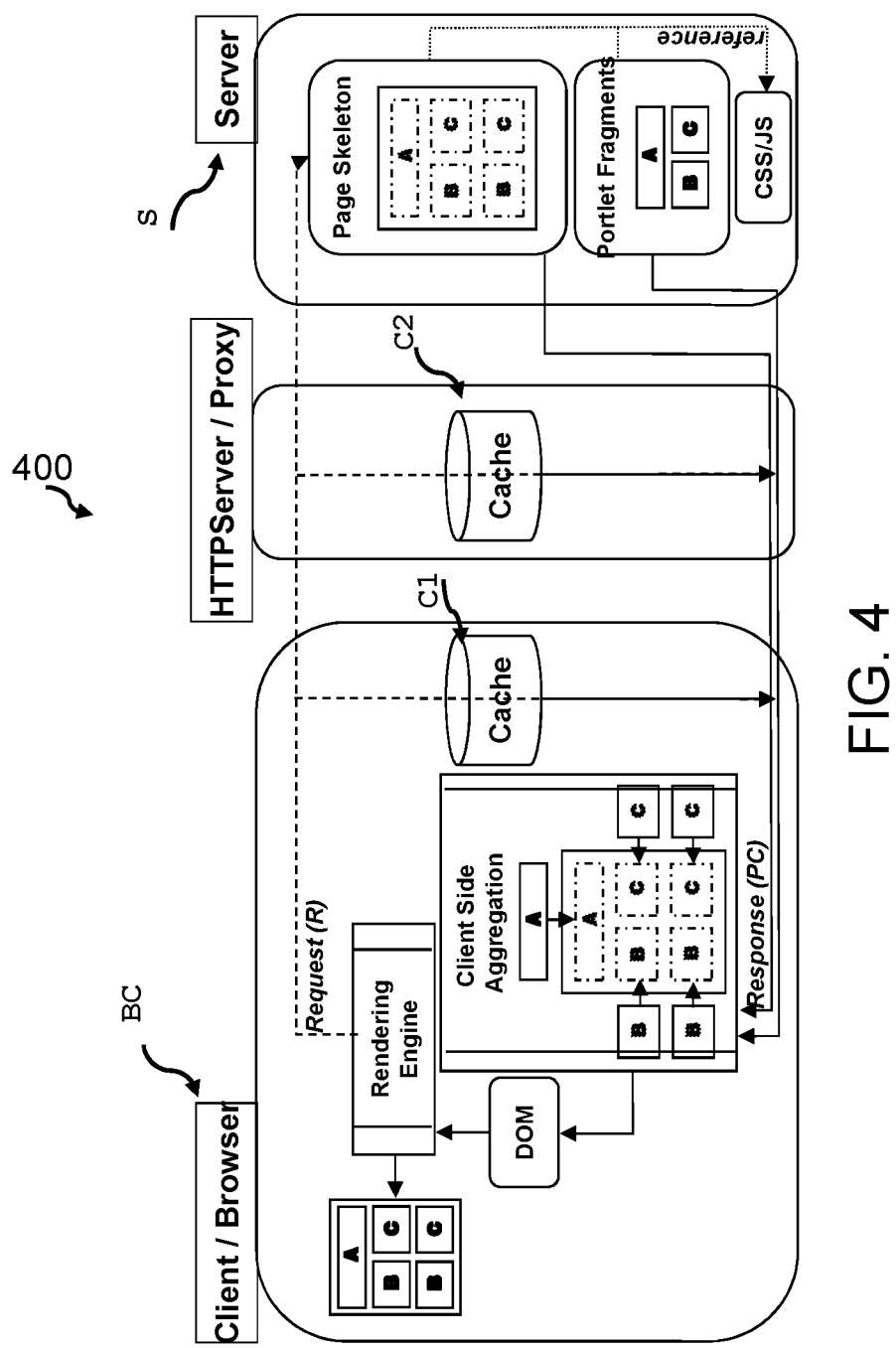
FIG. 4 shows a block diagram embodiment of elements and devices involved in the inventive method.

In contrast to FIG. 2 and FIG. 3, FIG. 4 shows a block diagram embodiment 400 of elements and devices involved in the inventive method presented above. Functional equivalent elements will not be described again. However, on the browser/client-side BC, the client aggregation function is clearly separated from the rendering element. The aggregation element aggregated all content inputs from the server into a document object model, DOM and may transfer it in HTML format to the rendering engine for displaying. Two clearly distinguished functional blocks for rendering and aggregating are suggested.

Figure 5:
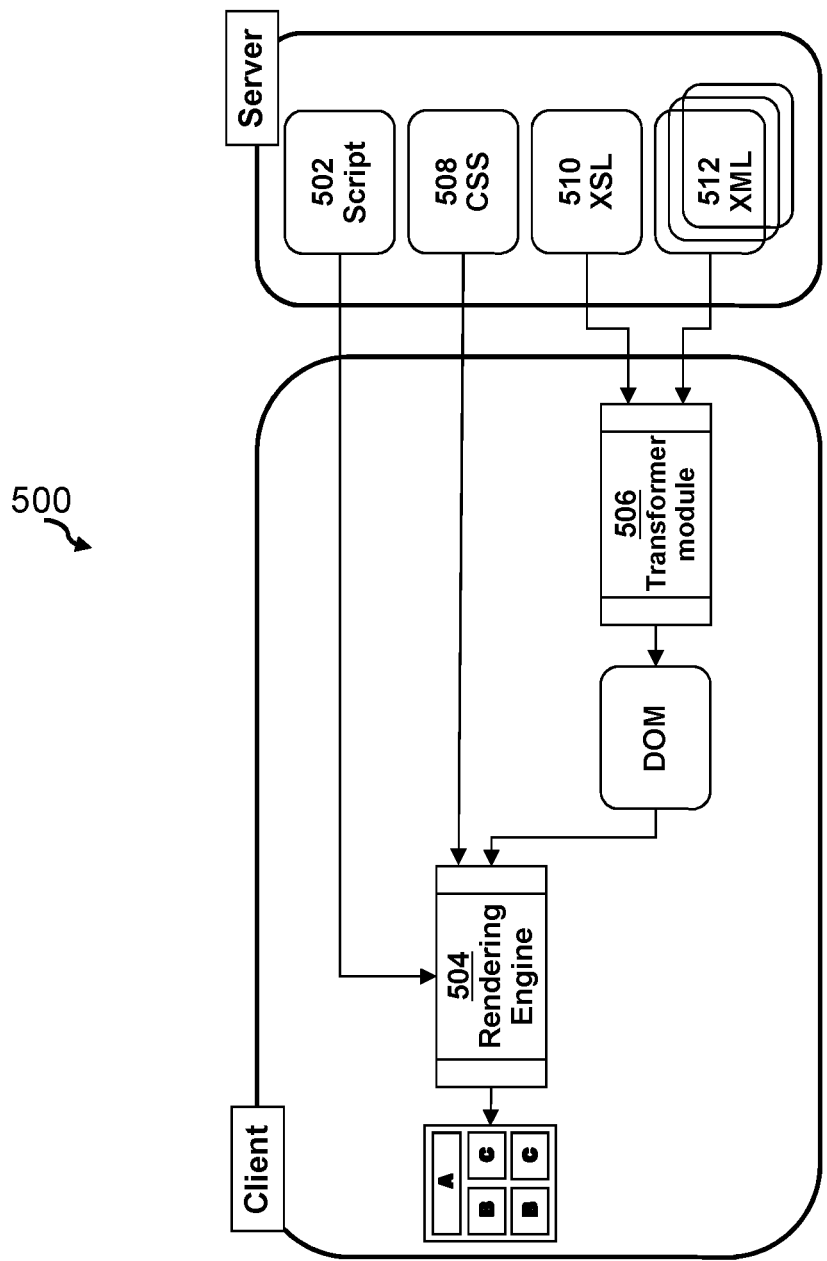
FIG. 5 shows a block diagram of an embodiment of the XSL transformer module.

FIG. 5 details this even more, with system 500 showing that aggregation and rendering is no longer combined, but separate.

Here, the inventive approach hooks in one step before the rendering process and performs an aggregation instead during the rendering process. As a result, the rendering process always receives the already aggregated content before scripts and styles are evaluated. Aggregation and rendering including script execution are logically decoupled. For this approach the browser built-in XSLT processor or transformer module may be leveraged.

XSLT is a process of transformation of a source XML document into a target document based on a style-sheet language document (XSL). The target document may be in XML syntax or in another format, such as HTML or plain text. In the current case, the transformation to HTML may be required. XSLT style-sheet transformation instructions may be linked to external resources, e.g., on the server. During the XSL transformation, the XSLT transformer module may load required content from linked resources. With help of this functionality, transforming and loading of content, the XSLT transformation may be used in the described aggregation process.

The implementation of client-side aggregation in XSLT is especially straight forward, because it may natively be supported by the browser.

FIG. 5 shows the involved components on the client- and the server-side without any additional caches. There is the common rendering engine, the different kind of XML and XLS files and the transformer module that transform the XML to the HTML/DOM. Scripts 502 are provided directly to the rendering engine 504. The same applies to CSS 508. XSL 510 and XML files 512 may be directed—upon request—from the server to the transformer module 506 directly. Also the earlier described DOM document between the transformer module 506 and the rendering engine 504 is shown.

Figure 6:
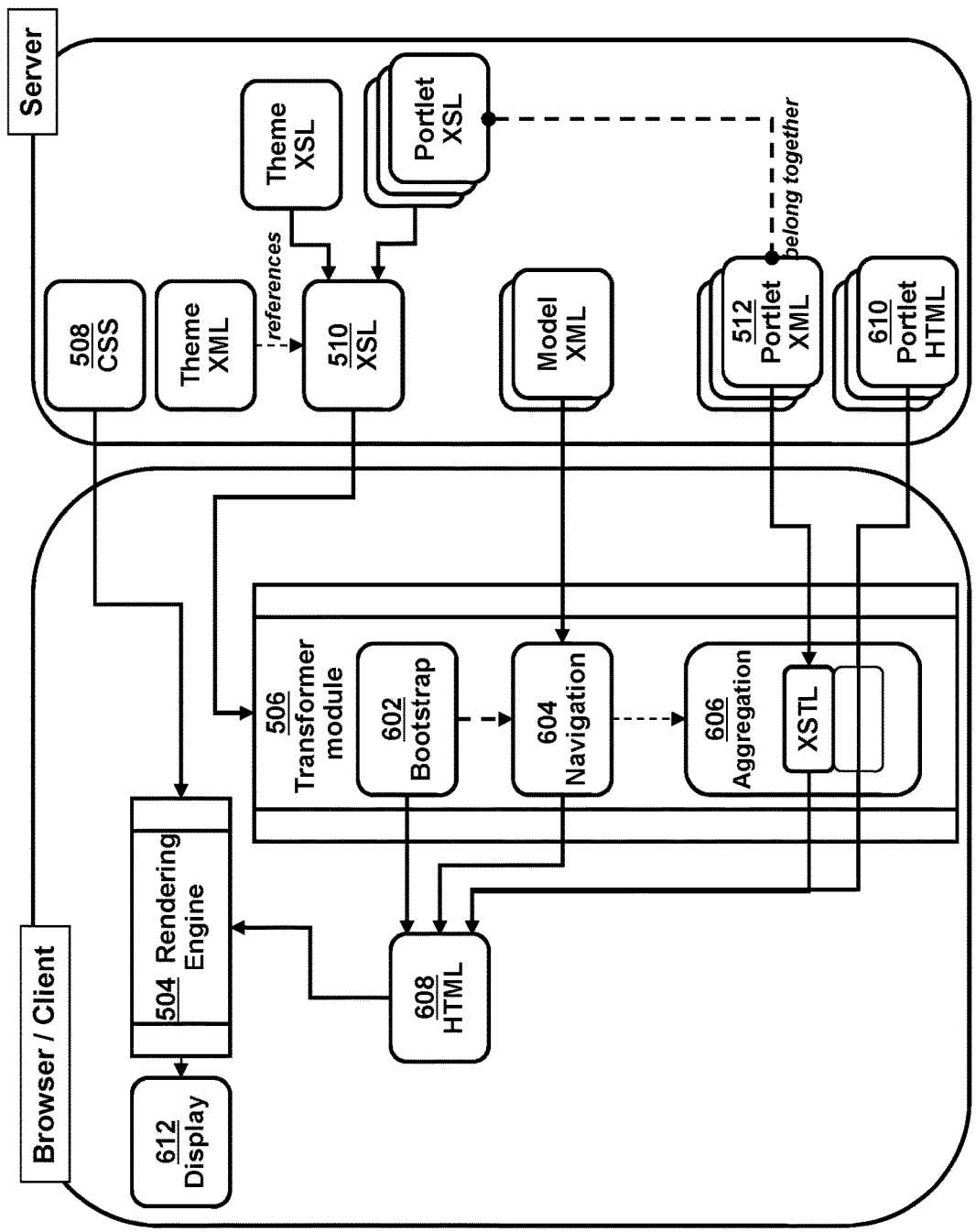
FIG. 6 details further components and elements of the inventive concept.

FIG. 6 details further components and elements of the inventive concept. The complete page content aggregation may be implemented as a single XSL transformer module 506 that is executed in the browser/client automatically when the server may response an XML document with an associated style-sheet language document (XSL) 510. In this approach, the client may send the usual request to the server and the server responses with a bootstrap XML document. The bootstrap may be performed by a bootstrap module 602 by serving the content of the web page as an XML document with an associated style-sheet document (XSL) (see also ref. "I" in FIG. 7). This bootstrap XML document may be very small and may only contain links to fragments of the web page. It may, e.g., have the following content:

```
<?xml          version='1.0'          encoding          ='UTF-8'?>
<xml-stylesheet
       type='text/XSL'
       href='/wps/contenthandler/XSTL/...'?>
<data>
...
</data>
```

The style-sheet document consists of the theme portion and optionally of style-sheets that transform XML based portlet fragments. The style-sheet content may be combined on the server during page initialization (see also ref. "II" in FIG. 7).

Figure 7:
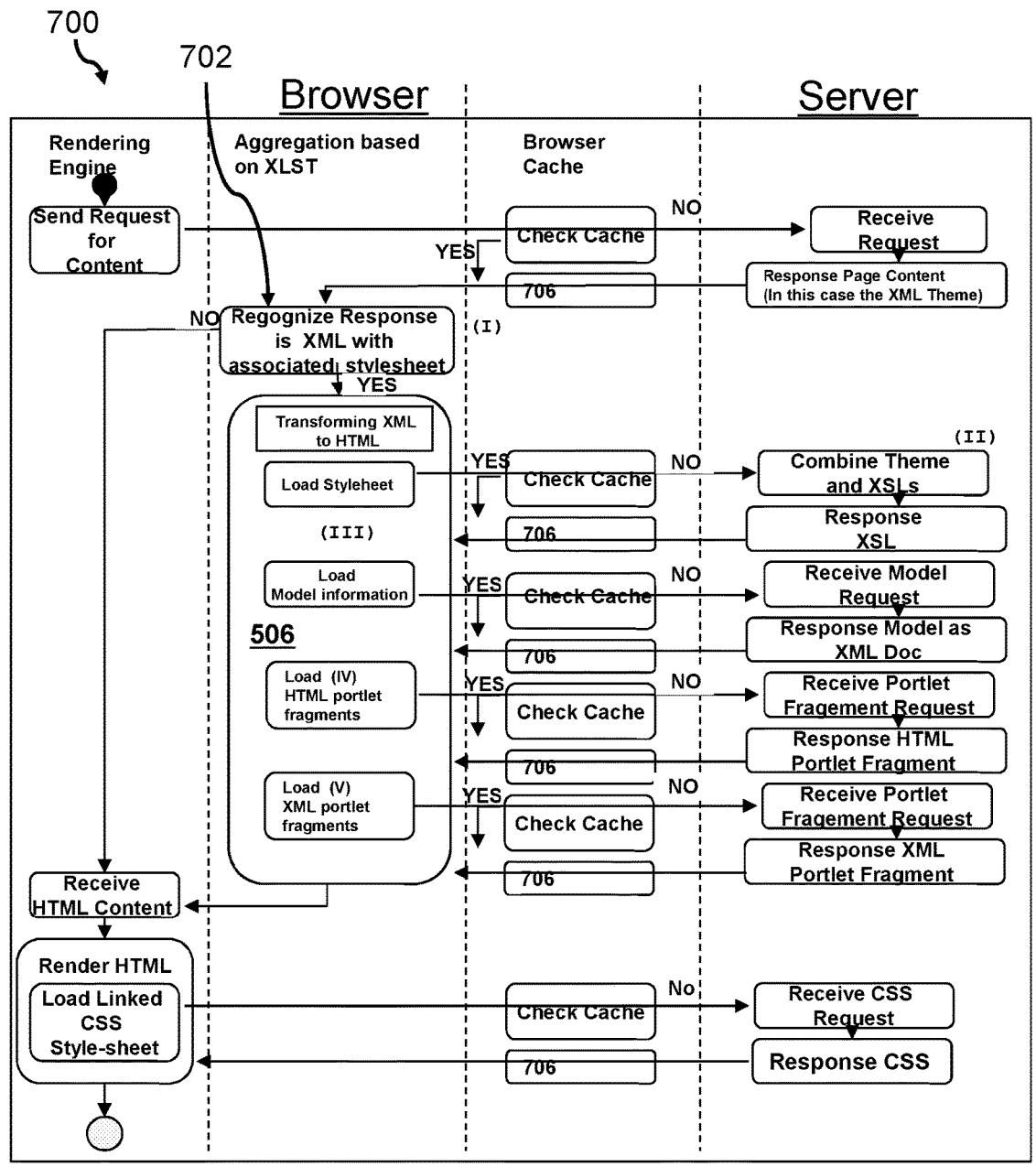
FIG. 7 shows an embodiment of a state diagram related to the inventive concept.

When the browser executes the transformation, it may use the document( ) function to pull in required fragments such as different kinds of feeds or portlet fragments (see also ref "III" in FIG. 7). The navigation REST feed, for example, may be used to display a navigation section in the page or the layout model feed to create a structure hierarchy of the portlet fragments. This is shown in block 604. Also the core aggregation component is shown as element 606 in FIG. 6.

Portlet fragments can either be HTML documents 610 or XML, documents 512. Traditionally, portlets generate HTML fragments that are directly embedded into the target mark-up (see also ref "VI" in FIG. 7). Portlets may also produce XML fragments and participate in the already executed transformation. These fragments would be transformed first and then embedded (see also ref. "V" in FIG. 7) into the framing content.

Portlet XML elements 512 and portlet HTML elements 610 may be individually cacheable fragments.

The result of a transformation may then be provided to the rendering process performed by the rendering engine 504 of the browser which may render the web page content the same way as in the server-side aggregation case for display 612.

The following flow diagram of FIG. 7 shows the flow diagram of the inventive process 700 implemented with the preferred client-side XSLT transformation in a portal environment based on a XSLT theme, beginning with the browser's request and ending with the rendered aggregated page content. However, the key aspect of the inventive method may be the aggregation of the content before the rendering process. This aggregation may be performed by blocks 702 and 704. The caches may be checked (in FIG. 7, "Check Cache") for content for a specified URL that may already be available. Reference numerals 706 may denote a "save response if possible".

Figure 8:
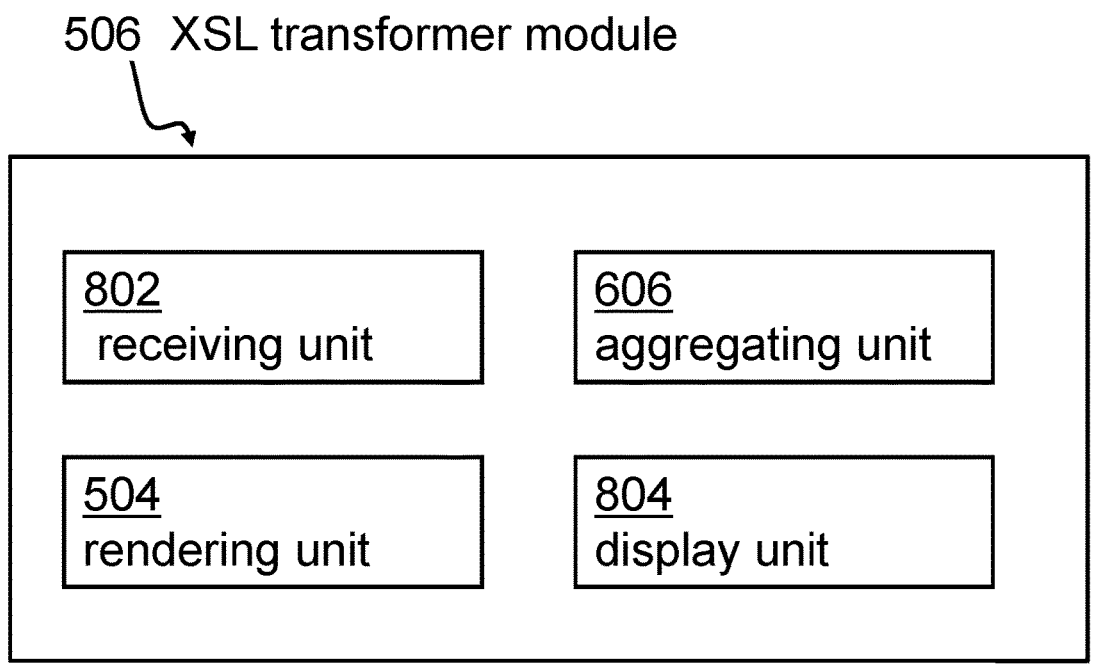
FIG. 8 shows another embodiment of a block diagram of the XSL transformer module for client-side aggregation.

FIG. 8 shows another view of a block diagram of the transformer or XSL transformer module 506 for client-side aggregation of web content. The XSL transformer module may comprise a receiving unit 802 adapted for receiving a web content structure document of a web page with an associated style-sheet by a client system, an aggregation unit 606 adapted for aggregating the web content on the client-side by transforming the web content structure document into a target web page document by using the style-sheet, wherein during the aggregation further web content is received based on information in the web content structure document using the style-sheet document resulting in a fully aggregated web page, and wherein the aggregation unit activities may not interfere with any other client-side transformation of the web content. Furthermore, a rendering unit 504 adapted for rendering the fully aggregated web page, and a displaying unit 804 adapted for displaying the rendered fully aggregated web page are present.

Figure 9:
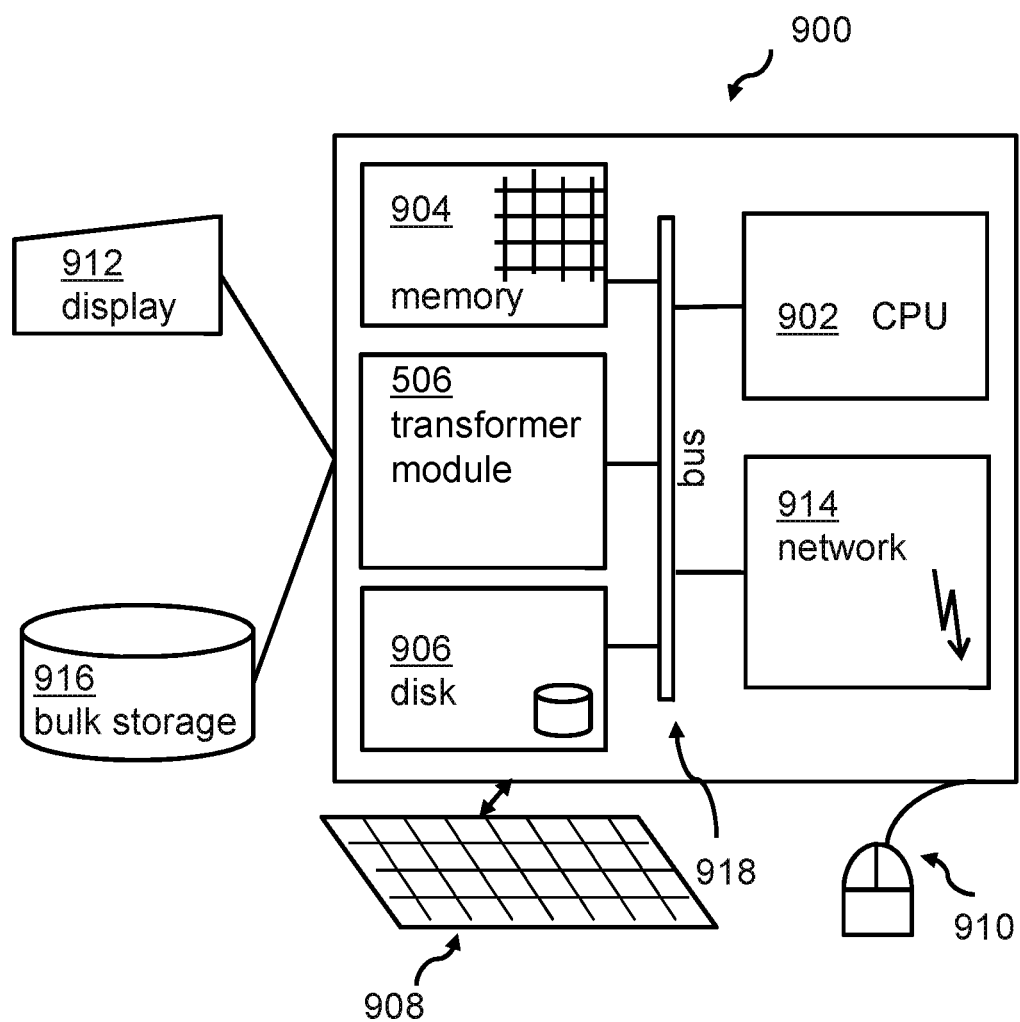
FIG. 9 shows an embodiment of a computing system comprising the XSL transformer module.

Embodiments of the invention may be implemented together with virtually any type of computer, regardless of the platform being suitable for storing and/or executing program code. For example, as shown in FIG. 9, a computing system 900 may include one or more processor(s) 902 with one or more cores per processor, associated memory elements 904, an internal storage device 906 (e.g., a hard disk, an optical drive such as a compact disk drive or digital video disk (DVD) drive, a flash memory stick, a solid-state disk, etc.), and numerous other elements and functionalities, typical of today's computers (not shown). The memory elements 904 may include a main memory, e.g., a random access memory (RAM), employed during actual execution of the program code, and a cache memory, which may provide temporary storage of at least some program code and/or data in order to reduce the number of times, code and/or data must be retrieved from a long-term storage medium or external bulk storage 916 for an execution. Elements inside the computing system 900 may be linked together by means of a bus system 918 with corresponding adapters. Additionally, A XSL transformer module 506 for client-side aggregation of web content may also be attached to the bus system 918.

The computing system 900 may also include input means, such as a keyboard 908, a pointing device such as a mouse 910, or a microphone (not shown). Alternatively, the computing system may be equipped with a touch sensitive screen as main input device. Furthermore, the computing system 900, may include output means, such as a monitor or screen 912 [e.g., a liquid crystal display (LCD), a plasma display, a light emitting diode display (LED), or cathode ray tube (CRT) monitor]. The computing system 900 may be connected to a network (e.g., a local area network (LAN), a wide area network (WAN), such as the Internet or any other similar type of network, including wireless networks via a network interface connection 914. This may allow a coupling to other computer systems or a storage network or a tape drive. Those, skilled in the art will appreciate that many different types of computer systems exist, and the aforementioned input and output means may take other forms. Generally speaking, the computing system 900 may include at least the minimal processing, input and/or output means, necessary to practice embodiments of the invention.

The proposed method for client-side aggregation of web content may offer a couple of advantages:

In general, the present invention is advancement over the traditional client-side content aggregation. But, it may not follow the existing client-side approach of aggregating the content during the rendering process. In contrast to this, the inventive approach may aggregate the content before the rendering process, however, still on the client-side. So, the browser will always receive a logically complete page before scripts and styles may be evaluated. Consequently, compared to prior art of client-side aggregation, any script execution may not be influenced by the aggregation process, since this process may occur before the script execution and may not be interwoven. Thus, at first, the page mark-up may be completely aggregated without any script execution. Then, in a following step, scripts of the web page may be executed independently from the aggregation process. So, in contrast to prior art, aggregation and script execution may be separated. Additionally, it adapts the full page refresh on every click from the server-side aggregation to the client-side aggregation. This is described in detail in FIG. 4.

The inventive approach may not imply a particular implementation technology. The aggregation may be done with any technology that may be supported by browsers in that phase of the browser that may be located before the rendering process. One example of such a technology may be XSL transformation (XSLT), since the design concept of XSLT is to produce user facing mark-up, e.g., HTML, in contrast to technologies such as JavaScript that operate on top of already generated mark-up. The XSLT mark-up generation process may be able to combine multiple XML based mark-up sources. These different sources may represent components of the web page, e.g., portlets that get aggregated by the XSLT transformation.

The approach may also share advantages with existing client-side advantages like high performance and bandwidth saving because most of the page components may be cached in network nodes or a browser's cache.

Additionally, it may have the following advantages over existing client-side aggregation approaches: There may be no flickering of a user's view because the information fragments may be aggregated before the page may be rendered. There may be a clean full page refresh on every click which may prevent leaking of JavaScript memory. There may be full support for back buttons, bookmarks, and crawlers. Complex link rewriting may not be required because every click may result in a full page refresh. Complex script execution logic may not be required, since the web page may appear as a full web page to the browser and script may just be executed. It may also be ideal for mobile devices accessing the Internet, since the mark-up of the individual components may be smaller than the caching limit on, e.g., some mobile phones, in contrast to a serving of a full page.

An implementation of the current invention may be based on XSLT because this may have the following advantages: It is based on well-known standards and may be supported by all browsers, also on mobile devices. XML is smaller than HTML. This may reduce response element sizes. And, if portlets may generate XML instead of HTML fragments for the web page, an XSLT based implementation may also offload the rendering of the portlet's content to the client and reduce the bandwidth even more.

In the following, further advantageous embodiments will be described:

According to one embodiment of the method presented by the present invention, the step of aggregating may be completed before the step of rendering may be started. Using this separation, the step of aggregation and rendering may be logically separated completely. The aggregation may not be disturbed by any rendering activities like execution of scripts and styles.

According to a further embodiment of the method, the step of aggregating may be performed excluding any script execution. Script execution or an execution of Java-Code may be performed during the rendering step of the method. Again, it logically and time-wise decouples the two phases—aggregation and rendering—of the web page to be displayed. Thus, according to one embodiment of the method, scripts and styles of the web page may be evaluated and executed during the step of rendering.

According to an advantageous embodiment of the method, the aggregation may be implemented as a single extended style-sheet language transformation resulting in an HTML document. Thus, when a server may respond with an XML document with an associated style-sheet document on a client request, the extended style-sheet language transformation may be performed. The resulting HTML document may then represent the input for the step of rendering.

According to a further embodiment of the method, the aggregation may use a style-sheet document comprising theme components. This may enhance the applicability of the proposed method to a more or less complete range of applications.

According to one embodiment of the method, the style-sheet document may also comprise portlet related fragments. These may be present in the form of XML or HTML based documents. Thus, the normal mode of operation of web and/or portal pages may be handled by the inventive method.

According to a further embodiment of the method, individually received elements of the web page by the client may be independently cacheable on the client-side. This may have the advantage that no transmission of the complete web page content may be required. Only small elements, e.g., an individual portlet content that may be handled individually may be required for re-transmission after small changes to the content of the web page displayed by the client.

According to one embodiment of the method presented herein, relative universal resource locators (URLs) are used in the portlet fragments for navigation. This may represent another enhancement due to the following: An XSLT theme may request portlet fragments, so each fragment may be cached individually. However these portlet fragments may contain themselves URLs that may need to contain the full navigational state of all components, so, the fragments would face the same cache-ability issue as a full page. The XSLT approach used here may solve this problem by using relative URLs in the portlet fragments. Each relative URL may only contain that portion of the navigational state that may be relevant to the fragment. The theme may establish a base URL such that these relative URLs may be appended to the base to form the full state. As a consequence, the cache characteristics of a portlet fragment may be decoupled from those of the full page.

Furthermore, embodiments may take the form of a computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

It should also be noted that embodiments of the invention have been described with reference to different subject-matters. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

While the invention has been described with respect to a limited number of embodiments, those skilled in the art, having benefit of this disclosure, will appreciate that other embodiments may be devised, which do not depart from the scope of the invention, as disclosed herein. Accordingly, the scope of the invention should be limited only by the attached claims. Also, elements described in association with different embodiments may be combined. It should also be noted that reference signs in the claims should not be construed as limiting elements.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions, which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus provide processes for implementing the functions/acts specified in the flowchart and/or block diagram block or blocks.

The block diagrams in the Figures illustrate the architecture, functionality, and operation of possible implementations of systems, methods and computer program products according to various embodiments of the present disclosure. In this regard, each block in the block diagrams may represent a module, segment, or portion of code, which comprises one or more executable instructions for implementing the specified logical function(s). It should also be noted that, in some alternative implementations, the functions discussed hereinabove may occur out of the disclosed order. For example, two functions taught in succession may, in fact, be executed substantially concurrently, or the functions may sometimes be executed in the reverse order, depending upon the functionality involved. It will also be noted that each block of the block diagrams, and combinations of blocks in the block diagrams, may be implemented by special purpose hardware-based systems that perform the specified functions or acts, or combinations of special purpose hardware and computer instructions.

The terminology used herein is for the purpose of describing particular embodiments only and is not intended to limit of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiment was chosen and described in order to best explain the principles of the invention and the practical application, and to enable others of ordinary skills in the art to understand the invention for various embodiments with various modifications, as are suited to the particular use contemplated.

What is claimed is:

1. A method comprising:
   receiving, by a client system, a first set of content to be displayed on a web page and an associated style sheet that describes a visual layout to be used when displaying the web page;
   retrieving, by the client system, a second set of content to be displayed in the web page;
   aggregating, by the client system, the first set of content with the second set of content to create a combined set of content, wherein executing script from the associated style sheet is blocked until said combined set of content is created such that no interaction between said aggregating and said executing the script occurs;
   in response to the combined set of content being created, creating a fully aggregated web page by transforming the combined set of content into a hypertext markup language (HTML) document;
   rendering, by a browser on the client system, the fully aggregated web page through use of the HTML document;
   displaying the rendered fully aggregated web page;
   detecting, by the client system, an activation of an element on the rendered fully aggregated web page, wherein the activation of the element causes a change to the combined set of content; and
   in response to detecting the activation of the element on the rendered fully aggregated web page, executing a full page refresh of the rendered fully aggregated web page, wherein the full page refresh of the rendered fully aggregated web page releases memory that contained the associated style sheet.

2. The method of claim 1, further comprising:
   storing the change to the combined set of content in the memory that was released by the full page refresh of the rendered aggregated web page.

3. The method according to claim 1, further comprising:
   receiving, by the client system, a uniform resource locator (URL) address for the associated style sheet;
   caching, in a cache in the client system, the URL address for the associated style-sheet;
   receiving, by the client system, a third set of content for the web page;
   retrieving, by the client system, the URL address for the associated style-sheet from the cache in the client system;
   retrieving, by the client system, the associated style-sheet at the URL address in the cache; and
   applying, by the client system, the associated style-sheet to the third set of content.

4. The method according to claim 1, wherein scripts and styles of the web page are evaluated and executed during said rendering the fully aggregated web page.

5. The method according to claim 1, wherein individually received elements of the web page by the client system are independently cached on the client-side.

6. The method of claim 1, further comprising:
   receiving, by the client system, notice of a change to a portlet fragment in the rendered fully aggregated web page, wherein the change to the portlet fragment is addressed by a relative uniform resource locator (URL), wherein the relative URL is an addendum to a main URL, and wherein the main URL is for all components of the rendered fully aggregated web page;
   caching, in a cache in the client system, the relative URL;
   retrieving, by the client system, the relative URL from the cache;
   retrieving, by the client system, the main URL;
   appending, by the client system, the relative URL to the main URL to create a full URL address for the change to the portlet fragment;
   retrieving, by the client system, the change to the portlet fragment from the full URL address;

modifying, by the client system, the rendered fully aggregated web page with the change to the portlet fragment to create a new fully aggregated web page;
rendering, by the browser on the client system, the new fully aggregated web page; and
displaying the new fully aggregated web page.

7. The method of claim 1, further comprising:
transmitting, from the client system to a server, a request for a first web content structure document that contains the first set of content;
in response to the server receiving the request for the first web content structure document, receiving, by the client system, a bootstrap XML document, wherein the bootstrap XML document contains only links to fragments of the web page.

8. A computer system comprising one or more processors, one or more computer readable memories, and one or more non-transitory computer readable storage mediums, and program instructions stored on at least one of the one or more non-transitory computer readable storage mediums for execution by at least one of the one or more processors via at least one of the one or more computer readable memories, the stored program instructions comprising:
program instructions to receive a first set of content to be displayed on a web page and an associated style sheet that describes a visual layout to be used when displaying the web page;
program instructions to retrieve a second set of content to be displayed in the web page;
program instructions to aggregate the first set of content with the second set of content to create a combined set of content, wherein executing script from the associated style sheet is blocked until said combined set of content is created such that no interaction between said aggregating and said executing the script occurs;
program instructions to, in response to the combined set of content being created, create a fully aggregated web page by transforming the combined set of content into a hypertext markup language (HTML) document;
program instructions to render, by a browser, the fully aggregated web page through use of the HTML document;
program instructions to display the rendered fully aggregated web page;
program instructions to detect an activation of an element on the rendered fully aggregated web page, wherein the activation of the element causes a change to the combined set of content; and
program instructions to, in response to detecting the activation of the element on the rendered fully aggregated web page, execute a full page refresh of the rendered fully aggregated web page, wherein the full page refresh of the rendered fully aggregated web page releases memory that contained the associated style sheet.

9. The computer system of claim 8, further comprising:
program instructions to store the change to the combined set of content in the memory that was released by the full page refresh of the rendered aggregated web page.

10. The computer system of claim 8, further comprising:
program instructions to receive a uniform resource locator (URL) address for the associated style sheet;
program instructions to cache the URL address for the associated style-sheet;
program instructions to receive a third set of content for the web page;
program instructions to retrieve the URL address for the associated style-sheet from the cache in the client system;
program instructions to retrieve the associated style-sheet at the URL address in the cache; and
program instructions to apply the associated style-sheet to the third set of content.

11. The computer system of claim 8, wherein scripts and styles of the web page are evaluated and executed during said rendering the fully aggregated web page.

12. The computer system of claim 8, wherein individually received elements of the web page by the client system are independently cached on the client-side.

13. The computer system of claim 8, further comprising:
program instructions to receive notice of a change to a portlet fragment in the rendered fully aggregated web page, wherein the change to the portlet fragment is addressed by a relative uniform resource locator (URL), wherein the relative URL is an addendum to a main URL, and wherein the main URL is for all components of the rendered fully aggregated web page;
program instructions to cache the relative URL;
program instructions to retrieve the relative URL from the cache;
program instructions to retrieve the main URL;
program instructions to append the relative URL to the main URL to create a full URL address for the change to the portlet fragment;
program instructions to retrieve the change to the portlet fragment from the full URL address;
program instructions to modify the rendered fully aggregated web page with the change to the portlet fragment to create a new fully aggregated web page;
program instructions to render, by the browser, the new fully aggregated web page; and
program instructions to display the new fully aggregated web page.

14. The computer system of claim 8, further comprising:
program instructions to transmit, to a server, a request for a first web content structure document that contains the first set of content;
program instructions to, in response to the server receiving the request for the first web content structure document, receive a bootstrap XML document, wherein the bootstrap XML, document contains only links to fragments of the web page.

15. A computer program product for client-side aggregation of web content, the computer program product comprising a non-transitory computer readable storage medium having program code embodied therewith, the program code readable and executable by a processor to perform a method comprising:
receiving, by a client system, a first set of content to be displayed on a web page and an associated style sheet that describes a visual layout to be used when displaying the web page;
retrieving, by the client system, a second set of content to be displayed in the web page;
aggregating, by the client system, the first set of content with the second set of content to create a combined set of content, wherein executing script from the associated style sheet is blocked until said combined set of content is created such that no interaction between said aggregating and said executing the script occurs;
in response to the combined set of content being created, creating a fully aggregated web page by transforming the combined set of content into a hypertext markup language (HTML) document;

rendering, by a browser on the client system, the fully aggregated web page through use of the HTML document;

displaying the rendered fully aggregated web page;

detecting, by the client system, an activation of an element on the rendered fully aggregated web page, wherein the activation of the element causes a change to the combined set of content; and in response to detecting the activation of the element on the rendered fully aggregated web page, executing a full page refresh of the rendered fully aggregated web page, wherein the full page refresh of the rendered fully aggregated web page releases memory that contained the associated style sheet.

16. The computer program product of claim 15, wherein the method further comprises:

storing the change to the combined set of content in the memory that was released by the full page refresh of the rendered aggregated web page.

17. The computer program product of claim 15, wherein the method further comprises:

receiving, by the client system, a uniform resource locator (URL) address for the associated style sheet;

caching, in a cache in the client system, the URL address for the associated style-sheet;

receiving, by the client system, a third set of content for the web page;

retrieving, by the client system, the URL address for the associated style-sheet from the cache in the client system;

retrieving, by the client system, the associated style-sheet at the URL address in the cache; and applying, by the client system, the associated style-sheet to the third set of content.

18. The computer program product of claim 15, wherein individually received elements of the web page by the client system are independently cached on the client-side.

19. The computer program product of claim 15, wherein the method further comprises:

receiving, by the client system, notice of a change to a portlet fragment in the rendered fully aggregated web page, wherein the change to the portlet fragment is addressed by a relative uniform resource locator (URL), wherein the relative URL is an addendum to a main URL, and wherein the main URL is for all components of the rendered fully aggregated web page;

caching, in a cache in the client system, the relative URL;

retrieving, by the client system, the relative URL from the cache;

retrieving, by the client system, the main URL;

appending, by the client system, the relative URL to the main URL to create a full URL address for the change to the portlet fragment;

retrieving, by the client system, the change to the portlet fragment from the full URL address;

modifying, by the client system, the rendered fully aggregated web page with the change to the portlet fragment to create a new fully aggregated web page;

rendering, by the browser on the client system, the new fully aggregated web page; and displaying the new fully aggregated web page.

20. The computer program product of claim 15, wherein the method further comprises:

transmitting, from the client system to a server, a request for a first web content structure document that contains the first set of content;

in response to the server receiving the request for the first web content structure document, receiving, by the client system, a bootstrap XML document, wherein the bootstrap XML document contains only links to fragments of the web page.

* * * * *